(12) United States Patent
Shamlooh et al.

(10) Patent No.: US 11,773,311 B2
(45) Date of Patent: Oct. 3, 2023

(54) ACID-TOLERANT ALUMINUM-BASED GEL FORMULATION FOR CONFORMANCE CONTROL AND PREPARATIONS AND USES THEREOF

(71) Applicants: Qatar Foundation for Education, Science and Community Development, Doha (QA); Qatar University, Doha (QA)

(72) Inventors: Mohamed Shamlooh, Doha (QA); Ibnelwaleed Ali Hussein, Doha (QA); Mustafa Nasser, Doha (QA); Musaab Magzoub, Doha (QA); Saeed Salehi, Doha (QA)

(73) Assignees: QATAR FOUNDATION FOR EDUCATION, SCIENCE AND COMMUNITY DEVELOPMENT, Doha (QA); QATAR UNIVERSITY, Doha (QA)

( * ) Notice: Subject to any disclaimer, the term of this patent is extended or adjusted under 35 U.S.C. 154(b) by 49 days.

(21) Appl. No.: 17/349,194

(22) Filed: Jun. 16, 2021

(65) Prior Publication Data
US 2021/0395599 A1 Dec. 23, 2021

Related U.S. Application Data

(60) Provisional application No. 63/040,291, filed on Jun. 17, 2020.

(51) Int. Cl.
| | |
|---|---|
| *C09K 8/512* | (2006.01) |
| *C09K 8/504* | (2006.01) |
| *E21B 33/13* | (2006.01) |
| *E21B 43/32* | (2006.01) |
| *C08K 3/22* | (2006.01) |

(52) U.S. Cl.
CPC ............ *C09K 8/5045* (2013.01); *E21B 33/13* (2013.01); *E21B 43/32* (2013.01); *C08K 2003/2227* (2013.01)

(58) Field of Classification Search
CPC ........ C09K 8/5045; C09K 8/03; C09K 8/032; C09K 8/508; C09K 8/512; E21B 33/13; E21B 43/32; C08K 2003/2227
See application file for complete search history.

(56) References Cited

U.S. PATENT DOCUMENTS 4,779,680 A * 10/1988 Sydansk ................ C09K 8/685
507/903

FOREIGN PATENT DOCUMENTS

CN 110105482 A * 8/2019 ............ C08F 120/54

OTHER PUBLICATIONS

Norisuye (T. Norisuye et al, Ultrasonic Investigation of the gelation process of poly(Acrylamide) gels, Macromol. Symp., 2006, 242, 208-215).*
Zhang; "Preformed particle gel transport through fractures"; Missouri S&T Library and Learning Resources; 2014 (203 pages).
Zhang, et al; Influence of salinity on the properties of the different HPAM/Al3+ systems; Oil Gas Sci. Technol.—vol. 74; 2019; (10 pages).
He; "Gelation Performance and Feasibility Study of an Environmental Friendly Improved Inorganic Aluminum Gel for Conformance Control Under Harsh Reservoir Conditions"; J. Energy Resour. Technol; Jan. 2017; (11 pages).
Al-Assi, et al; "Formation and Propagation of Gel Aggregates Using Partially Hydrolyzed Polyacrylamide and Aluminum Citrate"; Society of Petroleum Engineers, vol. 14, Issue 3; Sep. 2009; (3 pages).
Aguiar, et al; "A comprehenzive review of in situ polymer hydrogels for conformance control of oil reservoirs"; Oil & Gas Science and Technology; 2019; (14 pages).

* cited by examiner

*Primary Examiner* — Kumar R Bhushan
(74) *Attorney, Agent, or Firm* — K&L Gates LLP (57) ABSTRACT

A method for preparing PAM with the aluminum-based crosslinker is provided. The method includes diluting the PAM with deionized water; adding the crosslinker gradually while stirring at room temperature; sonicating in a water bath; adding HCl and KOH to adjust pH; and testing compatibility with salts.

11 Claims, 14 Drawing Sheets
(12 of 14 Drawing Sheet(s) Filed in Color)

ACID-TOLERANT ALUMINUM-BASED GEL FORMULATION FOR CONFORMANCE CONTROL AND PREPARATIONS AND USES THEREOF

PRIORITY CLAIM

This application claims priority to U.S. Provisional Patent Application No. 63/040,291, filed on Jun. 17, 2020, the entire contents of which are hereby incorporated by reference and relied upon.

BACKGROUND

Excessive water production from oil and gas wells is considered as one of the main challenges that influences the feasibility of production. It is estimated that the daily global production of water from oil reservoirs is around 220 million barrels; confining to a global average of 3:1 water to oil ratio. Processing this unwanted water, from separation to de-oiling and pumping, can be a lengthy and costly process that will increase the worldwide annual water handling cost to more than, 40 billion dollars. Beside the economic factor, the presence of water in the pipes and mid-stream facilities induces other problems including but not limited to, scale formation, corrosion, and microbial growth. Reducing the quantity of produced water not only impacts the cost of operation, but it also enhances the lifetime of the well and increases the recovery factor. Therefore, given the prevailing high water production and its associated problems as well as the strict environmental constrains of disposing it; there has been growing appeals for reducing the produced quantities to maintain an environment-friendly and a profitable operation.

Excessive water production usually results from an unsealed, or poorly sealed water production zone in the reservoir. Therefore, a common practice is to use a gelling solution that is designed to be injected as a liquid where it crosslinks after reaching the designated zone of water production.

SUMMARY

According to one non-limiting aspect of the present disclosure, an aluminum-based crosslinker may be selected from the group consisting of AlAc, AlNt, Al—AmAc, and combinations thereof.

According to another non-limiting aspect of the present disclosure, a polymeric loss circulation material is formed by crosslinking of PAM with the aluminum-based crosslinker.

According to another non-limiting aspect of the present disclosure, a formulation comprising the aluminum-based crosslinker may be used for conformance control, for example, as a stand-alone solution for reservoirs that suffers from excessive water production.

According to another non-limiting aspect of the present disclosure, a method for preparing PAM with the aluminum-based crosslinker, the method comprising: diluting the PAM with deionized water; adding the crosslinker gradually while stirring at room temperature; sonicating in a water bath; adding HCl and KOH to adjust pH; and testing compatibility with salts.

According to another non-limiting aspect of the present disclosure, a molecular weight of the PAM is about 700,000 Da.

According to another non-limiting aspect of the present disclosure, the PAM is diluted with the deionized water to attain 9 wt % polymer.

According to another non-limiting aspect of the present disclosure, the sonicating step is performed for 10 minutes.

According to another non-limiting aspect of the present disclosure, the concentrations of HCl and KOH added to adjust pH of the PAM with aluminum-based crosslinker are 39 wt % and 20 wt %, respectively.

According to another non-limiting aspect of the present disclosure, the compatibility of the PAM with aluminum-based crosslinker with salts is tested using pure NaCl and with seawater.

According to another non-limiting aspect of the present disclosure, the PAM with the aluminum-based crosslinker having about 9% PAM and 2 to 3 wt % AlAc and 1 wt % NS, pH ranging from 3.5 to 8.5.

According to another non-limiting aspect of the present disclosure, the PAM with the aluminum-based crosslinker having about 9% PAM and 4 to 5 wt % Al—AmAc and 1 wt % NS, pH ranging from 6 to 10.

According to another non-limiting aspect of the present disclosure, the PAM with the aluminum-based crosslinker having about 9% PAM and 2 to 3 wt % AlNt.

Additional features and advantages are described herein, and will be apparent from the following Detailed Description and the figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of the technology described herein may be better understood by reference to the accompanying drawings in which.

DETAILED DESCRIPTION

This disclosure introduces an aluminum-based crosslinkers that are able to crosslink polyacrylamide to be used for reservoirs with temperatures of less than 100° C. The disclosed formulation has a controllable gelation time as it can be triggered by changing the pH of the system. The different crosslinkers has also broad pH-window of applicability from 3 to 9 and temperature window from 25 to 100° C. The formulation can be used in a number of suitable applications, such as to seal near-wellbore fractures and high permeable zones.

Polyacrylamide liquid polymer is first diluted with deionized water to attain 9 wt % polymer. Then a predetermined amount of the crosslinker is gradually added while stirring. The gelling solutions were prepared at room temperature. The prepared solutions were stirred for 10 minutes followed sonication in a water bath for another 10 minutes to ensure a proper dispersion in the system. Highly concentrated solutions of HCl (39%) and KOH (20 wt %) were used to adjust the pH when needed. The compatibility of the solutions with salts was tested using pure NaCl and with seawater.

The disclosed polymeric loss circulation material formed by crosslinking of PAM with the aluminum based crosslinker outperformed commercial loss circulation material (LCM), and performance met the needs of loss circulation material functions. The gelation process which control the fluid ability and viscosity of the PAM/AlAc fluid can be controlled by pH and concentration of the polymers and cross linker. Moreover, the fracture sealing experiments showed perfect sealings with no flow after the gel is formed with 700 psi maximum sealing pressure by more than 90% increasing compared to cedar fiber. The 700 psi sealing pressure was observed in 30 minutes while gel is being formed and since the gelation time for the aluminum based gel is 50 minutes, the sealing pressure observed to increase more than 2000 psi after gel is fully matured after one hour. This will ensure the fractures or loss zones in the well will remain sealed enough for the drilling process to be resumed safely.

The disclosed technology is more environment-friendly material that can be used for offshore as well as onshore operations; has broader pH-window of applicability; and is more tolerant toward acidic conditions and the presence of acidic gases in the reservoirs (such as $H_2S$ and $CO_2$).

The colloidal crosslinkers can also be crushed to nanoparticles for the potential use in unconventional reservoirs.

The formulation can be used as a stand-alone solution for reservoirs that suffers from excessive water production, especially sour reservoirs. Reservoir characterization is an essential part that defines the degree of success to identify the cause and the zone of water production where the treatment should target. Such formulations are usually used with packers to direct the gelling solution specifically to the designated zone and to prevent formation damage in the pay-zones.

Stability of the Colloidal Crosslinkers

The preparation procedure is as follows: Polyacrylamide with a molecular weight of 700,000 Da was supplied by SNF Floerger with an active content of 20 wt %. The liquid polymer sample is first diluted with deionized water to attain 9 wt % polymer. Then a predetermined amount of the crosslinker is gradually added while stirring. The gelling solutions were prepared at room temperature. The prepared solutions were stirred for 10 minutes followed sonication in a water bath for another 10 minutes to ensure a proper dispersion in the system. Highly concentrated solutions of HCl (39%) and KOH (20 wt %) were used to adjust the pH when needed. The compatibility of the solutions with salts was tested using pure NaCl and with seawater (composition of used seawater in Table 1).

TABLE 1

| Composition of seawater | |
|---|---|
| Salt | Concentration, gm/L |
| $NaHCO_3$ | 0.2382 |
| $Na_2SO_4$ | 6.5754 |
| $CaCl_2 \cdot H_2O$ | 2.3945 |
| $MgCl_2 \cdot 6H_2O$ | 18.0539 |
| Nacl | 40.2738 |

Figure 1:
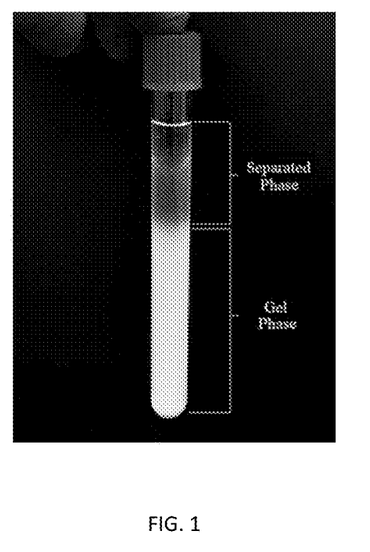
FIG. 1 shows an exemplary separation in a gel sample due to the settling of colloids.

After preparing the solutions at room temperature, the solutions were then poured in GL18 Duran test tubes and placed in an oil bath with a predetermined temperature for 24 hours to allow the system to cure and reach maturity. A sample is then retrieved from each system to examine the rheological behavior in Anton Paar Rheometer (MCR 302). Plate-Plate geometry with 25 mm diameter and 2 mm gap was used to test the mature gel samples. Frequency sweep tests were performed in the range between 1 to 100 Hz at a fixed strain of 10% (within the linear viscoelastic region). Values at 10 Hz were used for comparison between the different samples. Some separation was observed are some samples leaving a part of the sample to be poorly crosslinked, therefore, the percentage of the separated phase is reported to reflect the stability of the system after being aged for 24 hours at 75° C. (FIG. 1).

To assess the stability of the colloidal crosslinkers in the aqueous solutions, the zeta potential of the inorganic particles was tested. Zeta potential tests were performed in Malvern Nanosizer at room temperature. A solution of 3 mg/L particles in water was prepared, and then the pH of the system was adjusted from low to high pH values. Zeta potential experiments were conducted at ambient conditions. SEM imaging was done to examine the micro-structure of the gel. As the conventional SEM does not accept humid sample, the tested hydrogel was dried in the following procedure: 1) The sample was dried in a regular freezer at a temperature of −20° C. for 48 hours) The sample was then froze at −40° C. under vacuum conditions using virtis Freeze Drying Equipment. The SEM tests were then conducted using Nova Nano SEM 450, FEI.

Performance of Aluminum-Based Crosslinkers Under Different pH Conditions

Figure 2:
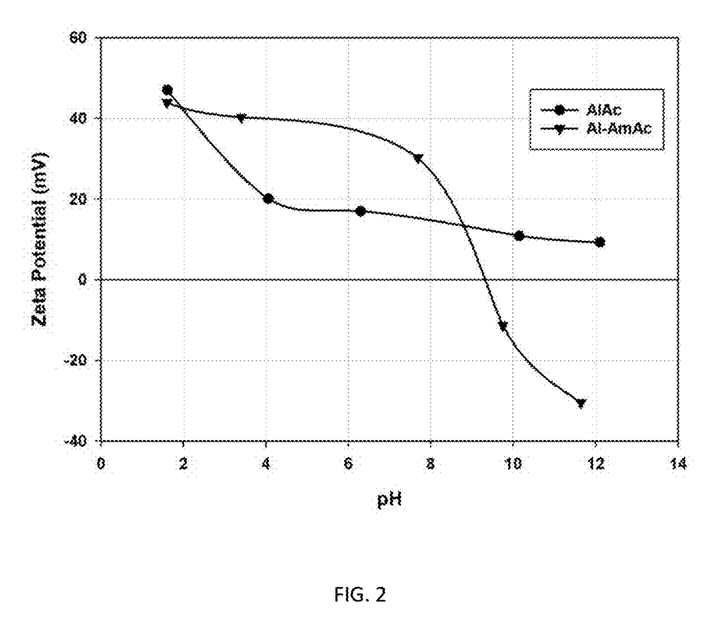
FIG. 2 is a graph showing an exemplary zeta potential of the colloidal crosslinkers.

Acidity of the system is a key parameter that controls the gelation process in crosslinkable polymeric systems. The gelation can be very fast at some conditions to produce a rapid gel while it fails to produce a gel at some other conditions. Among the three-screened crosslinkers, two of them exhibited a colloidal behavior: Al—Ac and Al—AmAc, where the physical stability and the suspension of the system affects the degree of success. On the other side, AlNt is soluble in aqueous media, within the studied range of parameters, where the degree of suspension is not an issue. The stability of both colloidal crosslinkers in aqueous solutions was studied through zeta potential (FIG. 2). For AlAc, it is clear that the stability decreases at higher pH conditions. Al—AmAc, however, showed the least stability in the pH range between 8 to 10.

The settling behavior of the gelants crosslinked with colloidal crosslinkers (AlAc and Al—AmAc) was in agreement with the zeta potential results as more separation was observed at higher pH conditions. Moreover, the both gelants reach a pH value where no more gel is produced due to the high settling rate; reducing the contact time between the polymer and the crosslinker. The sole system in both AlAc and Al—AmAc failed to produce a gel at pH conditions of more than 6.2 and 8.7, respectively. This behavior can be attributed to be resulting from two combined effects; the first is that the crosslinking reaction rate decreases with the increase in pH, unlike the behavior of chromium acetate, which exhibited a higher crosslinking rate in the high pH range. The other effect is because the stability of such particles decreases in the alkaline conditions where the settling rate becomes faster; allowing less contact time between the polymer and the crosslinker. To test this theory, Nanosilica (NS) was added to the system in an attempt to increase the stability of the colloidal system and decrease the settling rate, since NS succeeded to provide the stability of another colloidal crosslinker. As presented in Table 2, NS succeeded in physically stabilizing these systems where a gel was produced at conditions where gel was not producible in the absence of NS. In addition, it has successfully decreased the separation phase at the lower pH conditions. Hence, the results provide evidence that the destabilization of the system is the main factor that leads to the failure of inorganic colloidal particles to crosslink with PAM.

TABLE 2

Degree of suspension in the systems crosslinked with colloidal crosslinkers at different pH conditions

| System | pH | Separation Phase % (sole system) | Separation Phase % (with NS) | Notes |
|---|---|---|---|---|
| PAM 9 wt % + alac 3 wt % | 2.0 ± 0.5 | 0% | 0% | Rapid Gel |
|  | 4.0 ± 0.5 | 18.4% | 12.17% | More stability with NS |
|  | 6.0 ± 0.5 | 20.8% | 15.7% | More stability with NS |
|  | 8.0 ± 0.5 | 100% | 30.8% | No gel without NS |
|  | 10.0 ± 0.5 | 100% | 100% | No gel |
| PAM 9 wt % + Al-AmAc 5 wt % | 2.0 ± 0.5 | 0% | 0% | Rapid Gel |
|  | 4.0 ± 0.5 | 0% | 0% | Rapid Gel |
|  | 6.0 ± 0.5 | 0% | 0% | Stable with and without NS |
|  | 8.0 ± 0.5 | 23% | 0% | More stability with NS |
|  | 10.0 ± 0.5 | 100% | 7.2% | No gel without NS |

Figure 3:
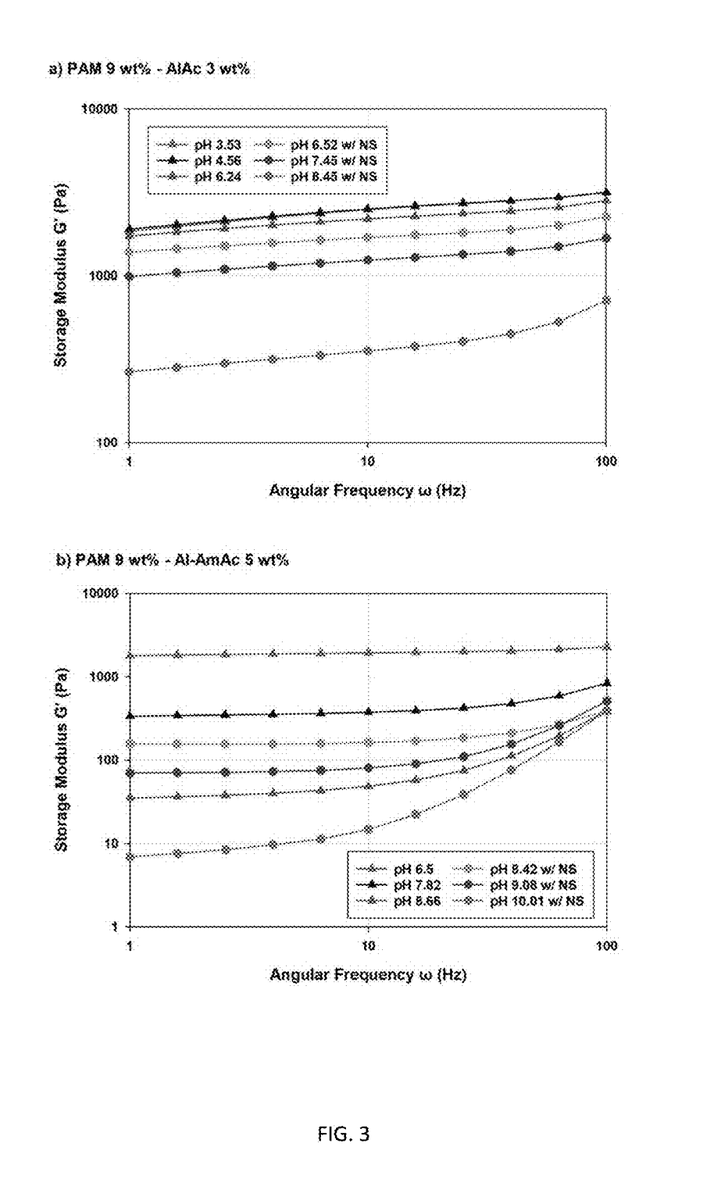
FIG. 3 is a graph showing an exemplary frequency sweep of PAM crosslinked with a) alac or b) Al-amac at varying pH conditions.
Figure 4:
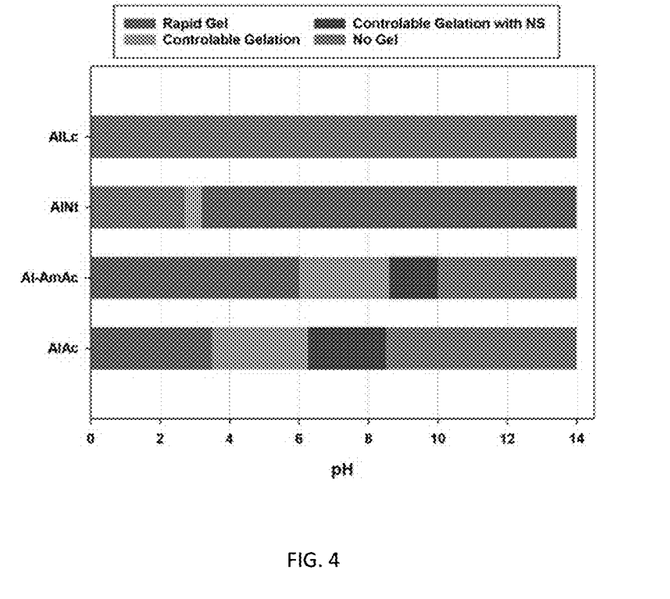
FIG. 4 shows an exemplary behavior of the different aluminum-based-crosslinked-polyacrylamide at the whole pH range.

FIG. 3 shows the viscoelastic behavior for the systems crosslinked with AlAc and Al—AmAc, where the sole systems are plotted with triangles and the systems with NS are plotted with circular points. Both systems behaved in a similar manner where the high decrease in acidity produce a rapid gel and no gel is produced at high pH conditions. Moreover, the separation phase was observed to increase as the pH increases. Therefore, a conclusion can be drawn that the gelation rate decreases with the decrease of pH for these two colloidal crosslinkers. The strengthening effect of NS can also be observed in the PAM/Al—AmAc as higher strength was attained at similar pH conditions. Even with the addition of ammonium chloride as a retarder, AlNt had a very narrow window of controllable gelation. The solution remained viscous at the region between 2.8 to 3.2 where increasing the pH more than that produces a rapid gel while the system does not produce a gel, even at elevated temperatures, when the pH is decreased below that range. FIG. 4 summarizes the behavior of all the examined gelant systems in the whole pH range. Contrary to the behavior of chromium acetate, AlAc and Al—AmAc showed an increase in the gelation time with the increase in pH, where the system forms a rapid gel at low pH conditions. Consequently, aluminium based crosslinkers can be superior in the presence of acid gases (such as $H_2S$ and $CO_2$), which were proved to limit the application of chromium acetate and weakens the gel produced.

Effect of Temperature and Temperature Stability

Figure 5:
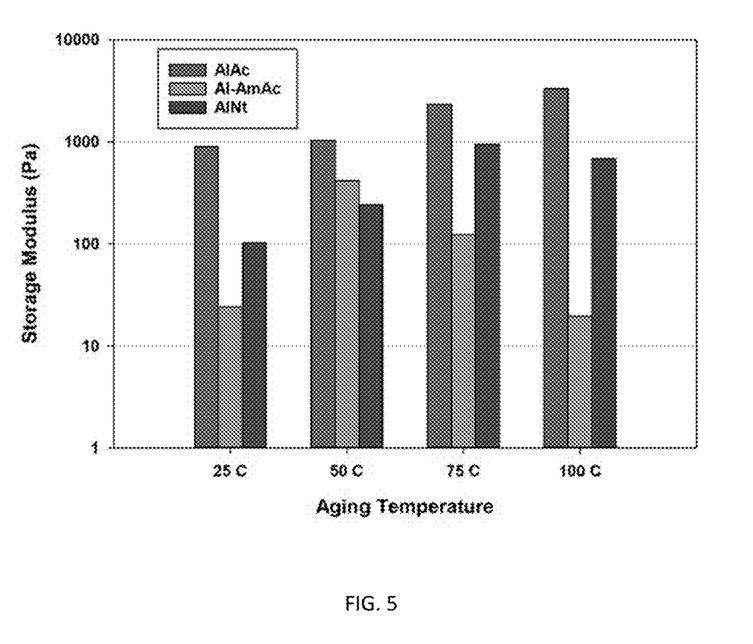
FIG. 5 is a graph showing an exemplary effect of aging temperature on the final gel strength.

Temperature plays an important role in the gelation process. The effect of temperature on the equilibrium gel strength is described in FIG. 5 in the range between 25 to 100° C. representing most of the oil reservoirs. The effect of temperature on the gelation system is complex as it can be an interaction of several consequences. On the one hand, the increase in the temperature is known to increase the crosslinking rate, which will hinder the particles from further settling, leading to more crosslinking intensity. On the other hand, polyacrylamide exhibits a thermal-thinning behavior, suggesting that the settling velocity of the colloids will increase with temperature. Furthermore, the degree of hydrolysis in PAM was found to increase at elevated temperatures; causing more amide groups to turn into carboxylates. While some researchers described the carboxylate groups as the crosslinking sites; the increase in temperature can increase the crosslinking density in the bulk of the system. Moreover, thermal stresses in general are known to weaken the strength of materials. Therefore, the combined effect of all the above led to the behavior shown in FIG. 5. The strength of AlAc system had a directly proportional relation with temperature within the studied scale, while both AlNt and Al—AmAc had a polynomial-behavior where a peak was reached followed by a decrease in the strength. Similar polynomial-like behavior was reported for PAM/Chromium-Acetate gelant in the literature.

Figure 6:
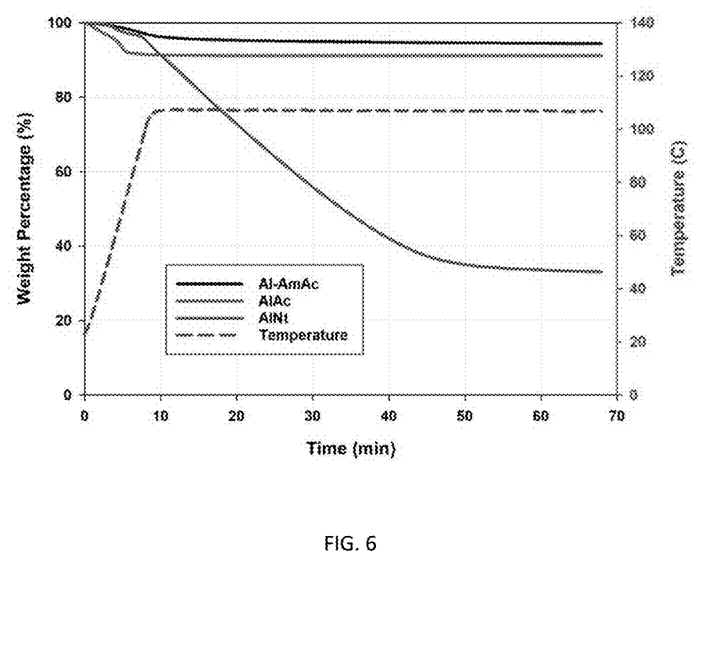
FIG. 6 is a graph showing an exemplary thermogravimetric analysis for the screened crosslinkers.

Thermogravimetric analysis was carried out for the screened crosslinkers (FIG. 6). AlAc and Al—AmAc revealed a good thermal stability to a temperature of up to 105° C. Weight loss of less than 10% was observed in both systems, which is mostly can be attributed to the loss of moisture content. On the contrary, AlNt showed a poor behavior where around 67% of the net weight was lost by exposing it to a temperature of 105° C. AlNt holds nine water molecules per each molecule of aluminum nitrate $(Al(NO_3)_3 \cdot 9H_2O)$ naturally. However, calculating the water content reveals that it only accounts for around 43% of the net mass in the system. The remaining lost 24% can be explained by the chemical properties of the compound. AlNt has a melting point and a boiling point of 72.8° C. and 135° C., respectively. Thus, at a temperature of 105° C., AlNt has some vapor pressure that is swept away by the purging nitrogen gas leading to continuous decrease in the net weight. As a resultant of this behavior, although the gel samples crosslinked with AlNt produced a good strength, it was observed that some syneresis started to develop after only 24 hours of aging. Therefore, AlNt can only produce a stable gel in low-temperature reservoirs.

Compatibility with Saline Water

Figure 7:
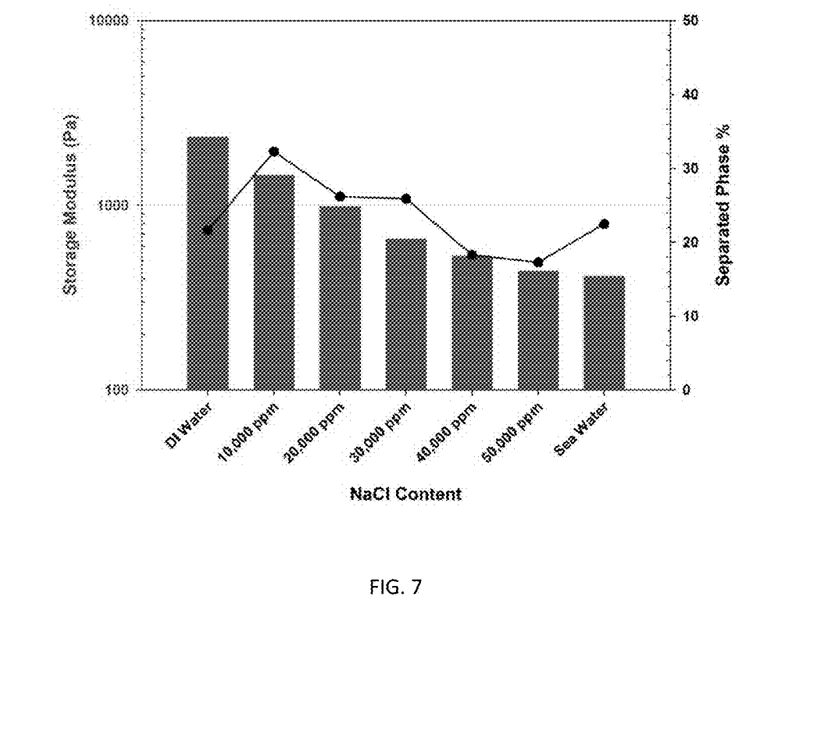
FIG. 7 is a graph showing an exemplary sanity effect on the gelation and stability of PAM/AlAc gelant.

In some oil reservoirs, especially in the offshore, access to fresh water may be limited. Therefore, it is essential to examine the compatibility of these systems with the salinity content. While the salt content had a positive impact on stabilizing the colloidal system by decreasing the separated phase, generally, it impacted negatively the equilibrium strength of the gel phase (FIG. 7). The main effect in the saline conditions is believed to be caused by the main polymer chain, not the colloidal crosslinkers. Salts have been reported to have shielding effect on acrylamide chains where the cations are adsorbed negatively-charged carboxylic group leading to a decrease in the available crosslinking sites. Moreover, salts cause the chains of polyacrylamide to shrink and encounter compaction more entanglements, hence, the accessibility of the crosslinkers to the crosslinking sites become limited and the probability of reaction decreases according to the collision theory. Moreover, it has been reported that the presence of salts has reversed the flocculation process using PAM in clay suspensions suggesting that salts give a better stability in the system similar to the behavior of aluminium as shown in FIG. 7.

Development of Gel with Time

Figure 8:
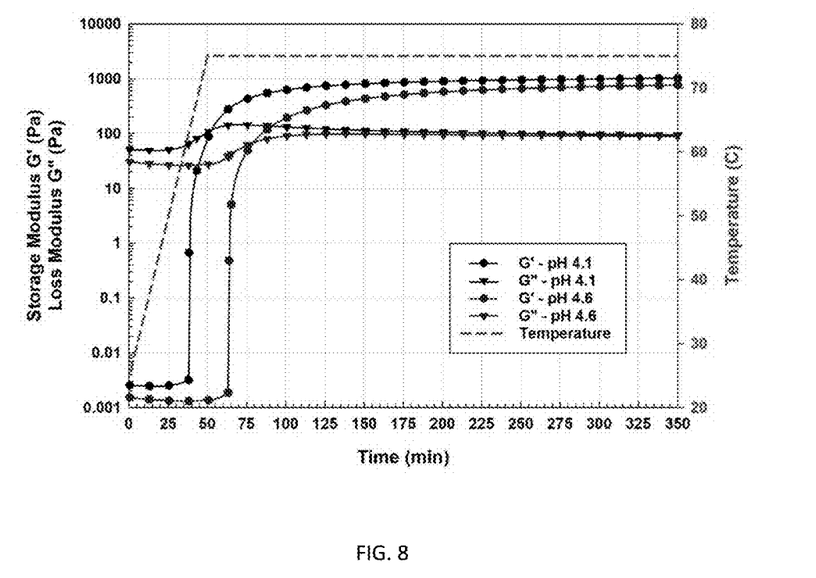
FIG. 8 is a graph showing an exemplary gelation profile of PAM/AlAc system.

The course of gelation is shown in FIG. 8 for PAM/AlAc system. The experiment was designed to mimic the injection process where the temperature was increased at a rate of 1° C./min and the pressure was kept at 500 psi. The gelation time is described as the time where the storage and loss modulus become equals where the solid-like behavior dominates beyond that point. The gelation time for the PAM/AlAc without pH modifications (4.1 pH) is around 50 minutes making it suitable for near-wellbore treatments. After 5 hours of exposing the sample to a temperature of 75° C., the storage modulus was still increasing at a very low rate. While the bottle test for the same sample reveals the equilibrium storage modulus after 24 hours of aging is around 2340 Pa, compared to 1025 Pa after 5 hour as presented in FIG. 8. This can be attributed to the slow rate of conversion as the system approaches the equilibrium where the crosslinking is not 100% complete after 5 hours. Moreover, the samples from the test tubes were measured at ambient conditions where the thermal stresses where released, which may have resulted in a higher strength. FIG. 8 also provides evidence of the reversed pH triggering where the slight increase of pH from 4.1 to 4.6 delayed the gelation from 50 to 80 minutes.

Gel Imaging

Figure 9:
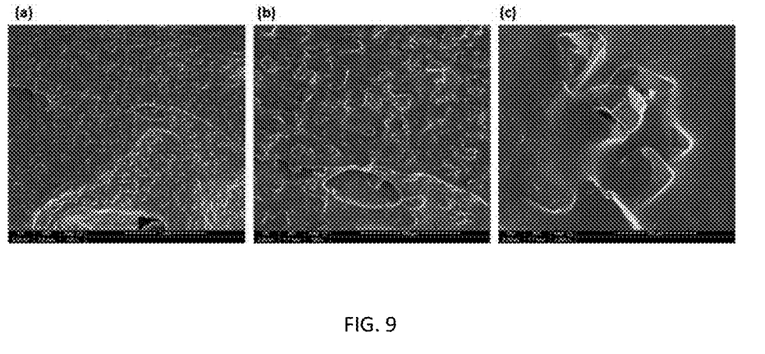
FIG. 9 shows SEM images of PAM/AlAc colloidal gel at a scale of a) 1 mm, b) 500 µm, and c) 100 µm.

SEM imaging was used to understand the nature of the colloids-polymer interaction on the micro level (FIG. 9). The images show the uniform distribution of the particles throughout the sample revealing the importance of physical stability for such systems. The 3D structure shows the behavior of polymer chains where they took the shape of sheets wrapping around the colloidal particles that provide the crosslinking. Similar to the other inorganic crosslinkers, it is believed that the crosslinking between aluminium colloidal crosslinkers and PAM is to be through coordination bonds. Moreover, the outcome of screening the different aluminium-based crosslinkers implies the highly dependence of the associated ligands on the gelation behavior. The presence of acetate functional group in both AlAc and Al—AmAc slowed down the crosslinking as the similarity between acetate and the carboxylic group on PAM shifted the equilibrium and had a retardation effect.

Rheology and Fracture Sealing

Figure 10:
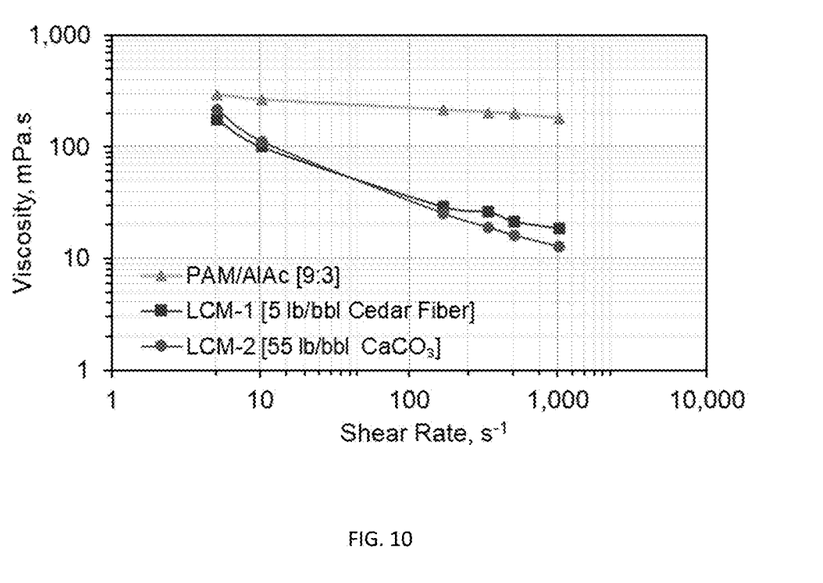
FIG. 10 is a graph showing an exemplary viscosity measurements at room temperature.
Figure 11:
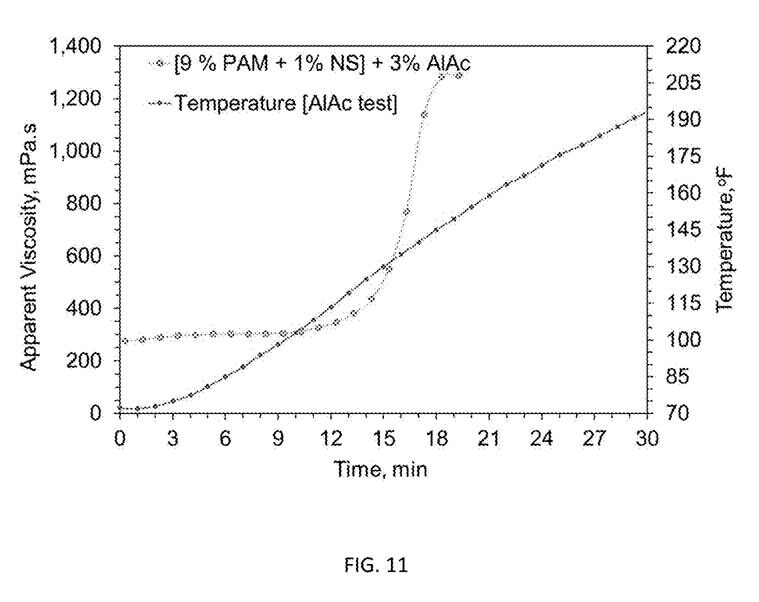
FIG. 11 is a graph showing an exemplary gelation of PAM/AlAc with respect to time and temperature.

Rheology of an LCM pill is a key parameter that influences performance of loss treatment since is governs the flow of fluids into the well and inside the fractures. Viscosity measurements and fracture sealing experiments were conducted to evaluate the performance of the invented PAM/AlAc pill for both low and elevated temperature applications. Two different commercial LCMs, calcium carbonate and cedar fiber are selected for the comparison as an example of current techniques used for fluid loss treatment. The calcium carbonate and cedar fiber are often used to treat loss circulation problems in formations with low and elevated temperatures up to 270° F. (130° C.). FIG. 10 shows the results of viscosity measurements conducted over shear rates range from 5 to 1020 $s^{-1}$ at 200° F. The measurements were conducted using Grace M3600 rheometer. The result of PAM/AlAc fluid is illustrated in comparison with the LCM-1 and LCM-2 drilling fluids formulated using cedar fiber and calcium carbonate, respectively. All fluids exhibited a shear thinning behavior, however the influence of shearing on PAM/AlAc fluid was insignificant. FIG. 11 shows the effect of gelation on the viscosities readings for the PAM/AlAc fluid, the shear rate was kept constant at 170 $s^{-1}$. While temperature was increased gradually until 200° F., then kept constant for the rest of the test duration. The heating is intended to resemble the gradual increase in temperature while fluid is injected into the well. During the gradual temperature ramp up, the viscosity of PAM/AlAc fluid remained almost constant, which indicates that gelation did not occur yet. Later at temperatures higher than 120° F., viscosity started to increase significantly because of the gelation process. The viscosity increased from 250 mPa·s up to 1250 mPa·s. Mature gel was observed in the measuring cylinder of the viscometer.

Figure 12:
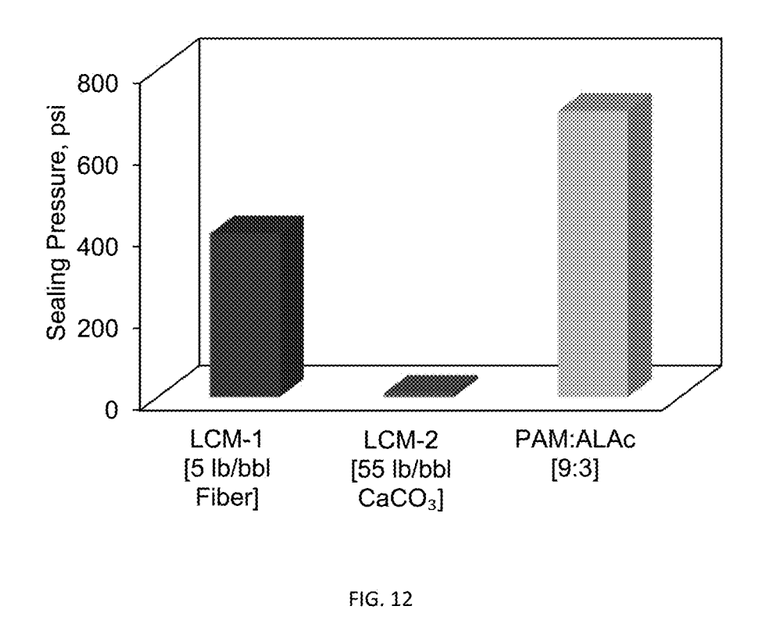
FIG. 12 is a graph showing an exemplary sealing pressure from the permeability plugging test.

The fracture sealing tests were conducted using a high pressure/high temperature (HPHT) permeability plugging tester (PPT) from OFITE. The test is usually used to evaluate the fracture sealing efficiency. The cumulative filtrates volume and sealing pressure are used as performance indicators. The fracture sealing tests were conducted for the two reference samples and for the PAM/AlAc pill using slotted aluminum disc to resemble fractures in the formation. FIG. 12 shows the sealing pressure. The polymeric gel formulated with PAM/AlAc gave the highest sealing pressure of a 700 psi, while LCM-1 and LCM-2 gave 400 psi and 10 psi, respectively.

Figure 13:
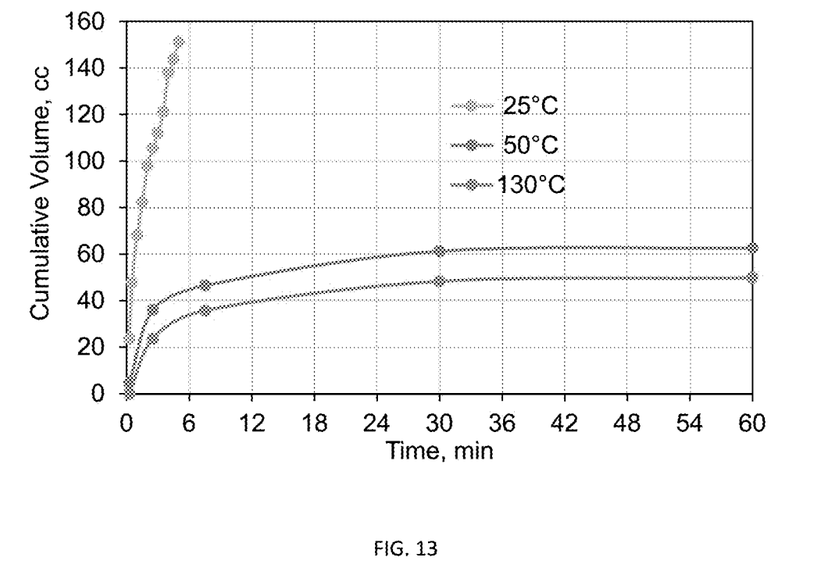
FIG. 13 is a graph showing results of injectivity test for PAM/PEI formula compared with the invented formula of PAM crosslinked with FNS.
Figure 14:
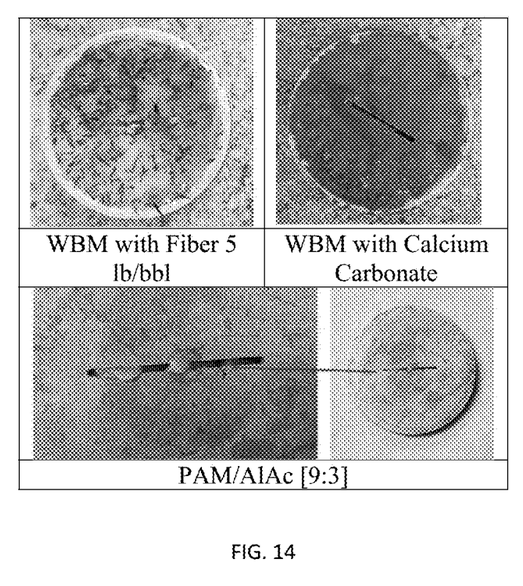
FIG. 14 are photographs showing an exemplary artificially fractured aluminum discs after the fracture sealing test with different fluids.

The progress of filtrates volume with time for the PAM/AlAc was assessed at three different temperature, 75° F., 120° F., and 270° F. The 75° F. was tested to simulate the surface mixing and preparation and injectivity process, since the fluid will be prepared in the surface and then injected into the well, it is recommended to have high injectivity at the beginning as shown in FIG. 13. The low 120° F. and elevated 270° F. resembles the operational reservoir temperature window of the invented PAM/AlAc pill. The results in FIG. 13. Shows the completely sealed fracture and no flow case in both tested reservoir temperatures, the pressure was kept 1000 psi in all experiments. FIG. 14 shows artificially fractured aluminum discs after the fracture sealing test with different fluids.

Excessive water production from oil reservoirs is a main challenge facing the oil and gas industry nowadays. Polymeric gelants have been widely applied to seal the water production zones leading to a more feasible production operation. This disclosure introduces a new inorganic crosslinker that can potentially replace the conventional chromium acetate as crosslinkers for polyacrylamide in low-temperature reservoirs. The developed formulation has the advantage of being more environment-friendly compared to the known-to-be toxic chromium acetate. The formulation has been tested through the whole pH range examining the rheological behavior of the mature gels in the temperature range between 25 to 100° C. While chromium acetate was proven to be sensitive to the presence of sour gases, namely $CO_2$ and $H_2S$, due to the inability to produce a stable gel at the acidic conditions, the proposed crosslinkers are more tolerable towards the high acidity. Unlike the conventional crosslinkers, the gelation rate in the proposed system was found to decrease with the increase in pH. The system has a controllable gelation time at pH conditions between 3.5 and 8.5 and is the most stable in the temperature range between 25 to 100° C.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for preparing PAM with the aluminum-based crosslinker, the method comprising:
   diluting the PAM with deionized water;
   adding the crosslinker gradually while stirring at room temperature;
   sonicating in a water bath;
   adding HCl and KOH to adjust pH; and
   testing compatibility with salts.

2. The method of claim 1, wherein a molecular weight of the PAM is about 700,000 Da.

3. The method of claim 1, wherein the PAM is diluted with the deionized water to attain 9 wt % polymer.

4. The method of claim 1, wherein the sonicating step is performed for 10 minutes.

5. The method of claim 1, wherein the concentrations of HCl and KOH are 39 wt % and 20 wt %, respectively.

6. The method of claim 1, wherein the compatibility with salts is tested using pure NaCl and with seawater.

7. The method of claim 1, wherein the method further comprising adding nanosilica (NS) to increase stability and decrease settling rate.

8. The method of claim 1, wherein the aluminum-based crosslinker is selected from the group consisting of AlAc, AlNt, Al—AmAc, and combinations thereof.

9. The method of claim 1, wherein the PAM with the aluminum-based crosslinker having about 9% PAM and 2 to 3 wt % AlAc and 1 wt % NS, pH ranging from 3.5 to 8.5.

10. The method of claim 1, wherein the PAM with the aluminum-based crosslinker having about 9% PAM and 4 to 5 wt % Al—AmAc and 1 wt % NS, pH ranging from 6 to 10.

11. The method of claim 1, wherein the PAM with the aluminum-based crosslinker having about 9% PAM and 2 to 3 wt % AlNt.

* * * * *